United States Patent
Bedi et al.

(10) Patent No.: US 10,430,920 B2
(45) Date of Patent: Oct. 1, 2019

(54) CONTENT-CONFORMING STAMP TOOL

(71) Applicant: Adobe Inc., San Jose, CA (US)

(72) Inventors: Ajay Bedi, Noida (IN); Sourabh Gupta, Noida (IN); Saurabh Gupta, Noida (IN)

(73) Assignee: Adobe Inc., San Jose, CA (US)

( * ) Notice: Subject to any disclaimer, the term of this patent is extended or adjusted under 35 U.S.C. 154(b) by 581 days.

(21) Appl. No.: 14/680,921

(22) Filed: Apr. 7, 2015

(65) Prior Publication Data
US 2016/0300322 A1    Oct. 13, 2016

(51) Int. Cl.
*G06T 3/00* (2006.01)
(52) U.S. Cl.
CPC ................... *G06T 3/0012* (2013.01)
(58) Field of Classification Search
CPC .................................................. G06T 3/0012
See application file for complete search history.

(56) References Cited

U.S. PATENT DOCUMENTS

| 2003/0063797 | A1* | 4/2003 | Mao | G06T 15/503 382/162 |
| 2003/0160824 | A1* | 8/2003 | Szumla | G06T 11/60 715/769 |
| 2006/0087519 | A1* | 4/2006 | Berger | G06T 11/60 345/619 |
| 2013/0287303 | A1* | 10/2013 | Tao | G06T 5/003 382/199 |

\* cited by examiner

*Primary Examiner* — Jacinta M Crawford
(74) *Attorney, Agent, or Firm* — SBMC

(57) ABSTRACT

Content-conforming stamp tool techniques are described. In one or more embodiments, a selection of an object in a digital image is received. An indication of a location in the digital image where the object is to be reproduced is also received. To reproduce and conform the object at the reproduction location, adjustments to a shape of the object are computed to conform a reproduction of the object to image content proximate the reproduction location. The adjustments are computed based on both the geometry of the image content at the source location and the geometry of the image content at the reproduction location. The adjustments are then applied to the shape of the object when it is reproduced at the reproduction location.

20 Claims, 7 Drawing Sheets

CONTENT-CONFORMING STAMP TOOL

BACKGROUND

With the growth of digital image use comes the development of countless image processing techniques, which enable users to change digital images. Those techniques are made available to users through image editing applications that have a variety of tools which correspond to the different techniques. For example, image editing applications are typically configured with a cropping tool that enables a user to select a sub-region of a given digital image and remove portions of the digital image outside the selected sub-region. Image editing applications also often include tools that enable a user to adjust contrast of a digital image, adjust brightness of the digital image, adjust sharpness of the digital image, apply colored or black-and-white filters to the digital image, and so on.

Another tool commonly included in image editing applications is a stamp tool. Broadly speaking, a stamp tool allows a user to select a portion (e.g., a source portion) of a digital image for reproduction elsewhere in the digital image, or for reproduction in another digital image. Based on a selection by the user of a reproduction location (e.g., in the same digital image or in another digital image), the stamp tool reproduces the selected source portion of the digital image at the reproduction location. However, conventionally configured stamp tools typically reproduce the selected source portion of the digital image at the reproduction location as it appeared at the source location, e.g., "as is". As a result, conventionally configured stamp tools are unsuitable for some image processing purposes.

SUMMARY

Content-conforming stamp tool techniques are described. In one or more embodiments, a selection of an object in a digital image is received. An indication of a location in the digital image where the object is to be reproduced is also received. To reproduce and conform the object at the reproduction location in the digital image, adjustments to a shape of the object are computed to conform a reproduction of the object to image content proximate the reproduction location. The adjustments are then applied to the shape of the object when it is reproduced at the reproduction location.

To conform the object to the image content proximate the reproduction location, a geometry of the image content at the reproduction location is considered. In one or more embodiments, an edge map of the digital image is derived that includes lines indicative of edges of the image content included in the digital image. From the lines of the edge map, a geometry of the image content at a source location (e.g., a location in the digital image from which the object was selected) and the geometry of the image content at the reproduction location are ascertained. The adjustments to the object are computed based on both the geometry of the image content at the source location and the geometry of the image content at the reproduction location. By way of example, the adjustments are computed based on transformation of the geometry of the image content at the source location to the geometry of the image content at the reproduction location. In this way, a new version of the digital image can be generated in which the object is reproduced at the reproduction location to conform to the geometry of the image content at the reproduction location.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
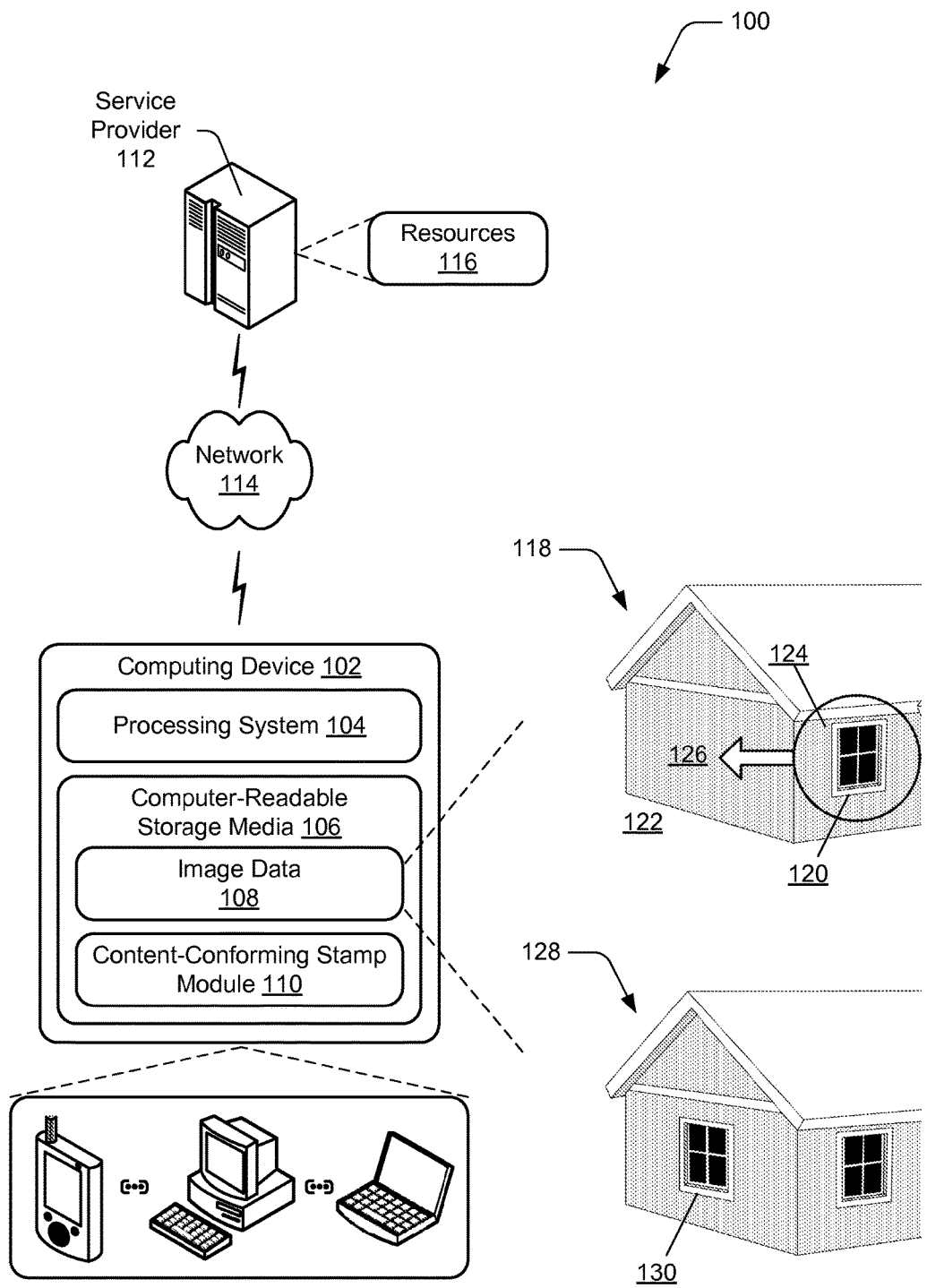
FIG. 1 is an illustration of an environment in an example embodiment that is operable to employ techniques described herein.

In some instances, conventionally configured stamp tools are unsuitable for reproducing an object selected from one portion of a digital image at another location in the digital image, or at a location in another digital image. By way of example, a building viewed in perspective may have a feature on one side of the building that a user would like to reproduce on a different side of the building, e.g., a window on a front of a house that the user would like to copy to a side of the house. Due to the different orientations of the sides of the building in the perspective view, however, mere reproduction of the object "as is" results in the reproduction failing to conform to the geometry of the building on the side of the reproduction location, as in the example depicted in FIG. 3. Consequently, conventionally configured stamp tools are not useful to reproduce some image objects.

Content-conforming stamp tool techniques are described. In one or more embodiments, an object is selected for reproduction from a source location of a digital image. A location is then selected where the object is to be reproduced, which may be in the same digital image from which the object was selected or may be in a different digital image.

Using the techniques described herein, the object is geometrically adjusted so that it conforms to image content at the location where it is reproduced.

To adjust the object to conform to image content at the reproduction location, a geometry of image content at the source location and a geometry of image content at the reproduction location are considered. Returning to the example of the building, a geometry of the source location side of the building and a geometry of the reproduction location side of the building are ascertained. The "geometry" of the sides of the building refers to the shapes, object edges, content, and angles of lines in the digital image with reference to the sides of the building. When image content under consideration has corners (e.g., it corresponds to a quadrilateral), for instance, the shapes can be determined using x- and y-coordinates indicative of the corners. Given the geometry of the image content at the source location and the reproduction location, a transformation is determined from the geometry of the source location image content to the geometry of the reproduction location image content. The determined transformation is then used to compute adjustments for a reproduction of the selected object, which adjust the reproduction to conform to the geometry of the image content at the reproduction location. In this way, objects from a surface captured in a digital image having one orientation may be reproduced on a surface captured in the digital image having another orientation. In contrast to conventional techniques, the reproduced object appears as if it is part of the image content at the reproduction location.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example embodiment that is operable to employ techniques described herein. The illustrated environment 100 includes a computing device 102 having a processing system 104 that includes one or more processing devices (e.g., processors) and one or more computer-readable storage media 106. The illustrated environment 100 also includes image data 108 and a content-conforming stamp module 110 ("CC stamp module 110") operable via the processing system 104 to implement corresponding functionality described herein. In at least some embodiments, the computing device 102 may include functionality to access various kinds of web-based resources (content and services), interact with online providers, and so forth as described in further detail below.

The computing device 102 is configurable as any suitable type of computing device. For example, the computing device 102 may be configured as a server, a desktop computer, a laptop computer, a mobile device (e.g., assuming a handheld configuration such as a tablet or mobile phone), a device configured to receive gesture input, a device configured to receive three-dimensional (3D) gestures as input, a device configured to receive speech input, a device configured to receive stylus-based input, a device configured to receive a combination of those inputs, and so forth. Thus, the computing device 102 may range from full resource devices with substantial memory and processor resources (e.g., servers, personal computers, game consoles) to a low-resource device with limited memory and/or processing resources (e.g., mobile devices). Additionally, although a single computing device 102 is shown, the computing device 102 may be representative of a plurality of different devices to perform operations "over the cloud" as further described in relation to FIG. 8.

The environment 100 further depicts one or more service providers 112, configured to communicate with computing device 102 over a network 114, such as the Internet, to provide a "cloud-based" computing environment. Generally speaking, service providers 112 are configured to make various resources 116 available over the network 114 to clients. In some scenarios, users may sign up for accounts that are employed to access corresponding resources from a provider. The provider may authenticate credentials of a user (e.g., username and password) before granting access to an account and corresponding resources 116. Other resources 116 may be made freely available, (e.g., without authentication or account-based access). The resources 116 can include any suitable combination of services and/or content typically made available over a network by one or more providers. Some examples of services include, but are not limited to, content creation services that offer image editing and drawing applications (e.g., Fresh Paint®, Creative Cloud®, and the like), digital image storage and/or sharing services, social network services (e.g., Facebook®, Twitter®, Instagram®, Hyperlapse®, and the like), and so forth.

These sources serve as significant amounts of image data. Image data 108 represents such image data, which may be formatted in any of a variety of digital image formats, including but not limited to JPEG, TIFF, RAW, GIF, BMP, PNG, and so on. The image data made available through the services may be posted by users that have accounts with those services. For example, a user having an account with a digital image storage and/or sharing service uploads digital images, such as those edited with an image editing application at computing device 102 of the user, or those sent to the user via electronic means. A user of the digital image storage and/or sharing service may then share their uploaded digital images with others, such as by providing a link to albums of digital images or to a profile of the user.

The CC stamp module 110 represents functionality to implement techniques for a content-conforming stamp tool as described herein. For example, as shown at 118, the CC stamp module 110 is configured in various ways to enable selection of an object 120 from an image 122, e.g., one that is included as part of the image data 108. To select an object from a displayed digital image, the user may trace around the object using a mouse or touch functionality of the computing device 102. Alternately or in addition, a user may simply click a mouse button when a cursor is near the object or tap near the object on a touch screen to select the object. This may cause the computing device 102 to determine the boundary of the selected object. In any case, the selection of the object indicates that it is to be reproduced elsewhere in the digital image or in another digital image. The location of the digital image from which the object is selected is referred to as the "source location" 124.

With regard to reproducing the object 120 elsewhere in the image 122 or in another digital image, the CC stamp module 110 is also configured to enable selection of a "reproduction location" 126, which corresponds to a location in the digital image or other digital image where the object is to be reproduced. To select the reproduction location, a user may tap a touch screen or click a mouse button relative to a portion of the digital image where the object is to be reproduced.

Once the reproduction location is selected, the CC stamp module 110 computes adjustments to the object so that when reproduced at the reproduction location the object conforms to the image content of the reproduction location. To conform the object to the image content of the reproduction location, the CC stamp module 110 ascertains both a geometry of image content at the source location and a geometry of image content at the reproduction location. Consider the example in which the image 122 under consideration depicts the outside of a building, the object 120 is selected at a source location 124 that corresponds to one side of the building, and the reproduction location 126 corresponds to another side of the building as further shown and described with reference to FIGS. 2-4. In this example, the CC stamp module 110 ascertains the geometry of the one side of the building (e.g., the image content at the source location 124) and the geometry of the other side of the building (e.g., the image content at the reproduction location 126).

Based on the ascertained geometries, the CC stamp module 110 determines a transformation between the geometry of the image content at the source location and a geometry of the image content at the reproduction location. The CC stamp module 110 uses the determined transformation to compute the geometric adjustments that conform the object to the geometry of the image content at the reproduction location. Continuing with the outside of the building example, the CC stamp module 110 uses the determined transformation to compute adjustments that conform the selected object 120 to the other side of the building. In this way, when the CC stamp module 110 reproduces the object 120 on the other side of the building, as shown at 128, the reproduced object 130 appears substantially as if it is part of the other side of the building. This contrasts with conventional stamp tools which simply reproduce a selected object "as is", e.g., without adjusting a shape of the reproduced object to conform to the image content of the reproduction location.

Having considered an example environment, consider now a discussion of some example details of the techniques for content-conforming stamp tools in accordance with one or more embodiments.

Content-Conforming Stamp Tool Details

Figure 2:
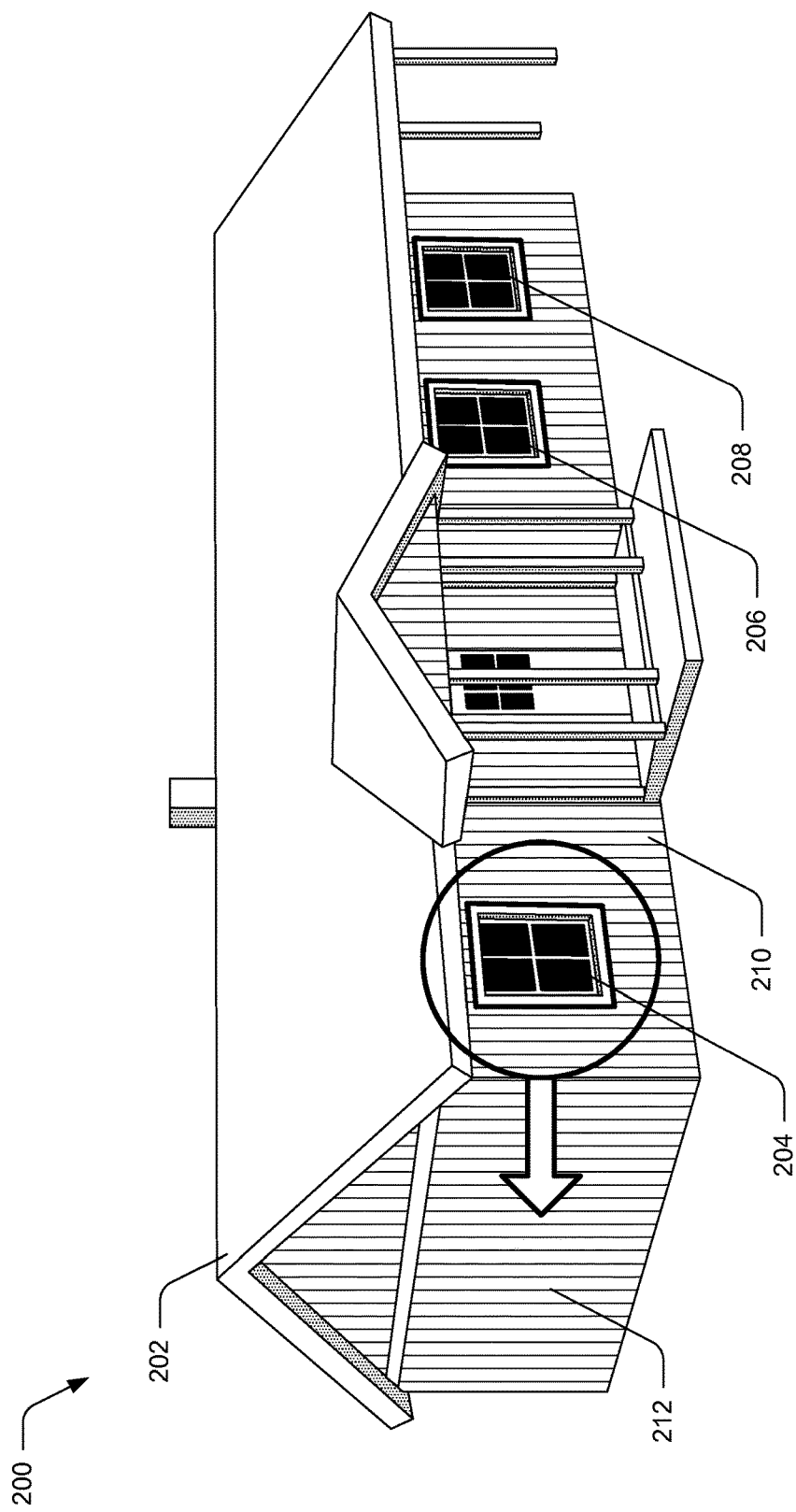
FIG. 2 is an example embodiment showing a digital image and an object that is selected from the digital image for reproduction in the digital image.

This section describes some example details of content-conforming stamp tool techniques in accordance with one or more embodiments. FIG. 2 depicts generally at 200 a digital image and an object that is selected from the digital image for reproduction in the digital image. In particular, FIG. 2 represents a digital image of a house 202, which includes windows 204, 206, 208 that are located on a front 210 of the house 202.

In this particular example, the window 204 is selected for reproduction. To select an object from a digital image, such as the window 204, a user may tap a touch screen of the computing device 102 or click a mouse button when a cursor is located at a portion of the digital image that corresponds to the object. In addition or alternately, a user may select the object by tracing around the object using touch functionality, dragging a cursor around the object, and so forth. The user may perform these actions to select the object via operation of a stamp tool of an image editing application. It should be appreciated that the object may be selected in a variety of different ways without departing from the spirit or scope of the techniques described herein.

As part of selecting an object from a digital image, the CC stamp module 110 may determine a boundary of the object. The pixels of the digital image within the boundary may be considered part of the object that is selected for reproduction, while pixels outside the boundary are not. In other words, portions of the captured digital image that are within the determined boundary correspond to the selected object. As such, those portions of the digital image may be distinguished from the rest of the digital image and selected as the object that is to be reproduced. Other techniques may be used to determine which portions of the digital image correspond to the selected object without departing from the spirit or scope of the techniques described herein.

Figure 3:
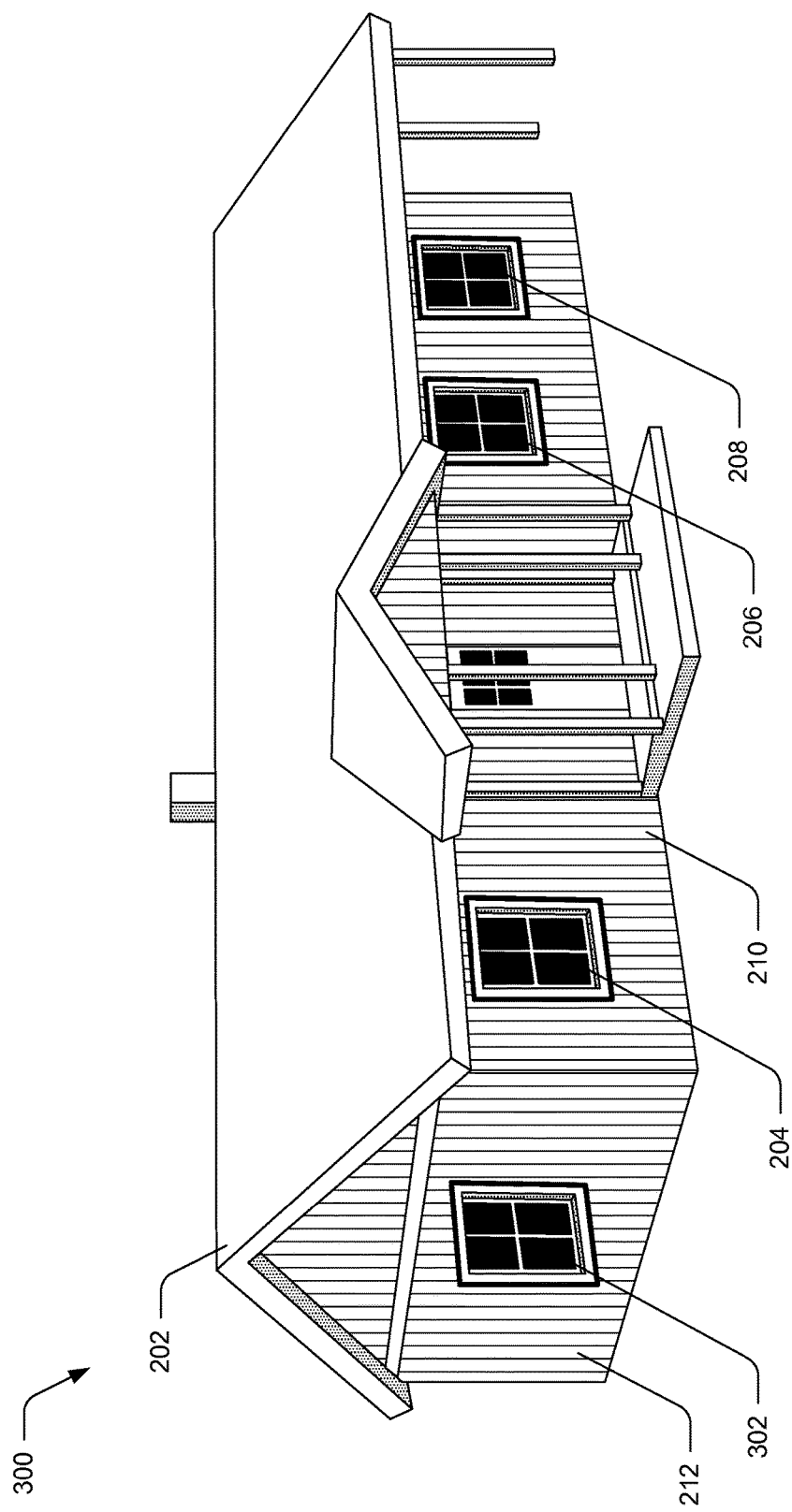
FIG. 3 is an example embodiment showing a reproduction of the object without conforming the object to the geometry of image content at the location where the object is reproduced.
Figure 4:
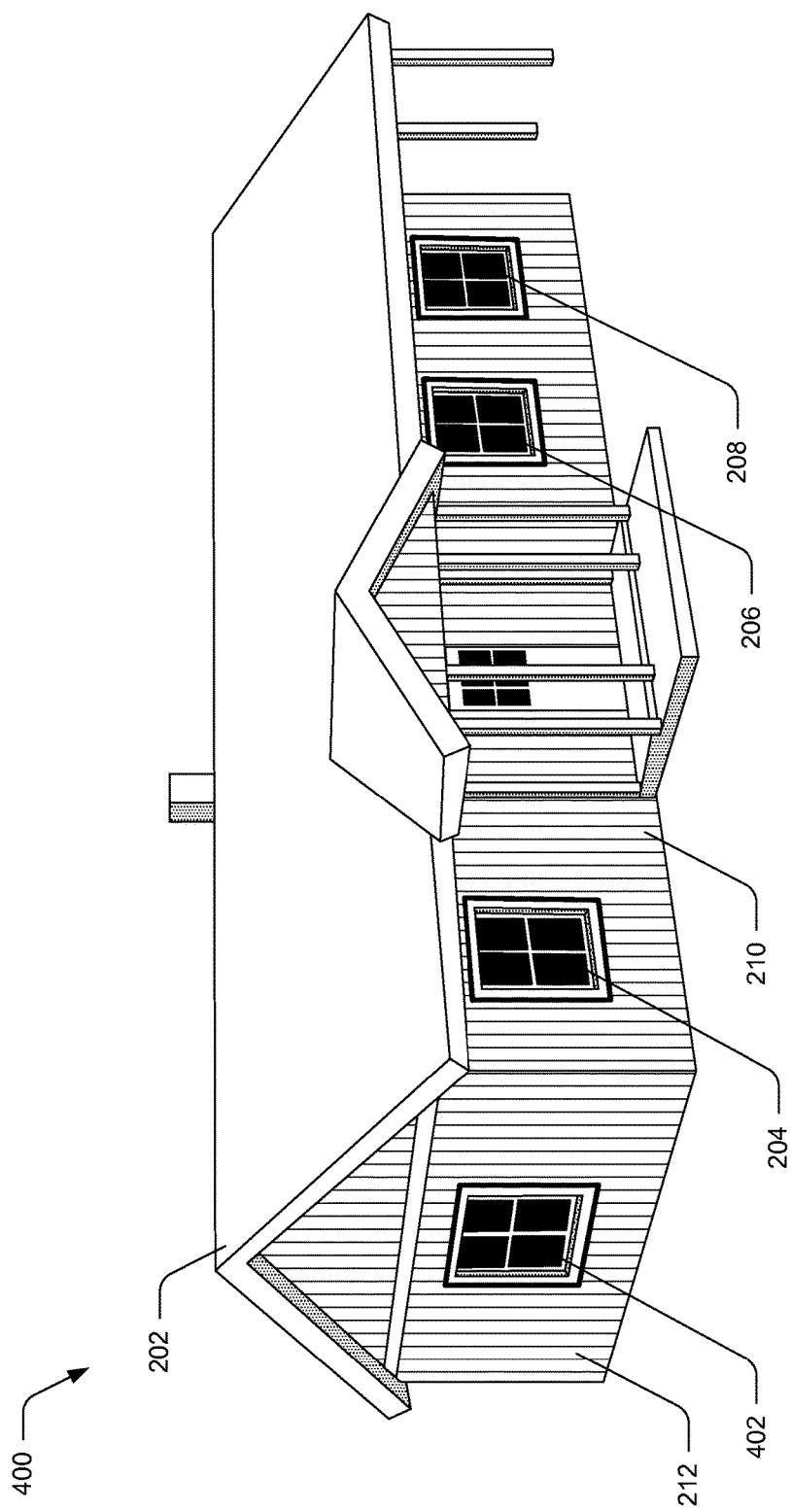
FIG. 4 is an example embodiment showing a reproduction of the object and in which the object is adjusted to conform to the geometry of image content at the location where the object is reproduced.

In addition to selecting objects from a digital image for reproduction, the techniques described herein enable a user to select a location in a digital image where the object is to be reproduced. FIGS. 2-4 illustrate a scenario in which the location where the object is to be reproduced is in the same digital image as the location from which the object is selected. Nonetheless, it should be contemplated that the object may be reproduced in a digital image other than the digital image from which the object is selected. In the scenario represented by FIGS. 2-4 an indication is received that the window 204 is to be reproduced on side 212 of the house 202. Thus, the side 212 corresponds to the reproduction location, e.g., the location in the digital image where the object is to be reproduced.

The reproduction location may be selected in a variety of manners. By way of example and not limitation, a user may select the reproduction location by tapping (e.g., with a finger or stylus) a touch screen that displays the digital image at a portion corresponding to the reproduction location. In a similar manner, a user may select the reproduction location by clicking a mouse button when a cursor is located at a portion of the digital image that corresponds to the reproduction location. Such a user action may automatically indicate that the selected portion of the digital image corresponds to the reproduction location. Alternately, such a user action may cause a menu to be displayed with an option that is selectable to reproduce the object at the selected portion of the digital image, such as "Reproduce Selected Object Here". The user may perform these actions to select the reproduction location via operation of the stamp tool of the image editing application. The reproduction location may be selected in other ways without departing from the spirit or scope of the techniques as described herein.

FIG. 3 depicts generally at 300 an example in which a reproduction of the object is not conformed to the geometry of image content at the location where the object is reproduced. In particular, FIG. 3 includes reproduction 302, which is a reproduction of the window 204, e.g., the selected object. The reproduction 302 is simply reproduced "as is". In other words, in shape, the reproduction 302 is the same as the object that is selected for reproduction, e.g., the window 204. Consequently, the reproduction 302 does not appear at 300 as if it is part of the side 212 of the house 202. Instead, the reproduction 302 appears out of place on the side 212.

In contrast, FIG. 4 depicts generally at 400 an example in which a reproduction of the object is adjusted to conform to the geometry of the image content at the location where the object is reproduced. FIG. 4 includes adjusted reproduction 402, which is an adjusted version of the window 204, e.g., the selected object. Unlike the reproduction 302, the adjusted reproduction 402 is not simply a version of the selected object reproduced "as is". Instead, a shape of the object is adjusted to conform to the geometry of the reproduction location. In this particular example, the adjusted reproduction 402 is a reproduction of the window 204 that is adjusted to conform to the geometry of the side 212 of the house 202, e.g., the geometry of the image content at the reproduction location. Consequently, the adjusted reproduction 402 appears substantially to be part of the side 212 of the house 202.

The reason that the reproduction 302 does not appear to be part of the side 212 of the house 202 is that the window 204 is on a different geometric plane (e.g., corresponding to the front 210 of the house 202) than where it is to be reproduced, e.g., the side 212 of the house 202. As used herein, the term "geometric plane" refers to a flat two-dimensional surface that approximates a surface of image content in a digital image. With reference to FIG. 2, the front 210 of the house 202 may be approximated by a first geometric plane and the side 212 may be approximated by a second geometric plane that intersects the first geometric plane. To conform a reproduction to image content at a reproduction location, the CC stamp module 110 accounts for the difference in geometric planes of image content at the source location and the reproduction location.

To do so, the CC stamp module 110 derives an edge map of the digital image. For example, the CC stamp module 110 derives an edge map by finding edges in the digital image using an existing technology, such as a canny edge detector. However, the canny edge detector used by the CC stamp module 110 is considered "modified" because adaptive hysteresis localization and thresholding is also performed so that noise in the digital image does not create false edges. The adaptive hysteresis localization and thresholding has the additional effect of causing the edges marked to closely approximate the edges of the digital image from which the edge map is derived. The result of using the "modified" canny edge detector is a black-and-white image having lines and points representing the edges of the image content.

Figure 5:
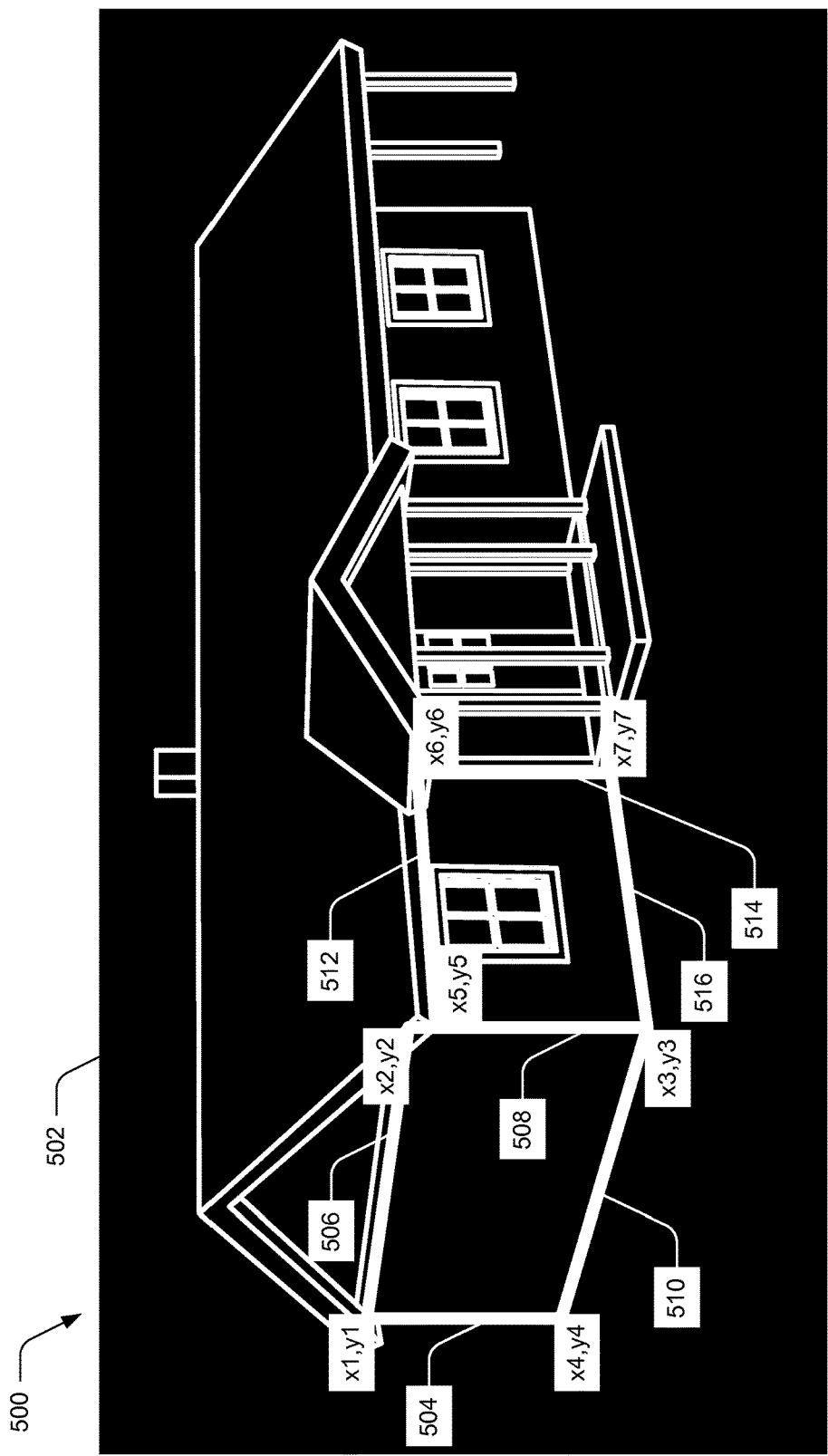
FIG. 5 is an example embodiment showing an edge map that is used for determining a geometry of source and reproduction locations in association with reproduction of an object in a digital image.

FIG. 5 depicts generally at 500 an example edge map that is usable to determine a geometry of source and reproduction locations in association with reproduction of an object in a digital image. The illustrated example represents an edge map 502 that corresponds to the digital image with the house 202 of FIG. 2, e.g., the digital image from which the object is selected for reproduction and the digital image where the object is to be reproduced. The representation of the edge map 502 includes lines that represent edges of image content (e.g., the house 202) depicted in that digital image, such as edge lines 504, 506, 508, 510, 512, 514, and 516. The edge lines are shown thicker than the other lines in the representation of the edge map 502 solely for illustration purposes. Accordingly, the CC stamp module 110 represents functionality to derive the edge map 502 from the digital image with the house 202 in the manner described above. The CC stamp module 110 also represents functionality to derive edge maps for both a source digital image and a target digital image, e.g., when the digital image from which the object is selected and the digital image in which the object is reproduced are different.

Given an edge map of the digital image under consideration, the CC stamp module 110 determines the edge lines that correspond to the geometries of the image content at the source and reproduction locations, e.g., the edge lines 504, 506, 508, 510, 512, 514, 516. To detect the edge lines, the CC stamp module 110 performs a Probabilistic Hough Transformation on the edge map. Some conventional techniques for detecting lines from an edge map use standard Hough Transformation. Although use of the Probabilistic Hough Transformation results in the detection of fewer lines, the detection of the lines using the Probabilistic Hough transformation is generally more accurate than detection using the standard Hough Transformation. Broadly speaking, the Probabilistic Hough Transformation avoids conducting a voting process that is performed by the standard Hough Transformation for every non-zero (e.g., not black) pixel. Instead, the Probabilistic Hough Transformation takes advantage of the geometrical properties of analytical curves. As a result, the Probabilistic Hough Transformation improves the efficiency with which lines are detected and reduces the storage used when the algorithm is performed to detect the lines.

In one or more embodiments, the CC stamp module 110 performs the Probabilistic Hough Transformation using a two-dimensional (2D) array (e.g., referred to as an "accumulator") to detect the existence of a line. The lines detected by the CC stamp module 110 can be described according to the following:

$$r = x \cos \theta + y \sin \theta$$

Here, x and y represent the relative x- and y-coordinate values of a given pixel. Given lines described in this way, the CC stamp module 110 searches the accumulator for lines using a predefined threshold. The dimension of the accumulator corresponds to the number of unknown parameters, which in this case is two because quantized values of r and θ are considered. For each pixel at (x, y) and a neighborhood of pixels surrounding the given pixel, the CC stamp module 110 uses the Probabilistic Hough Transformation to determine whether there is enough evidence of a straight line at the given pixel. If the CC stamp module 110 determines that there is sufficient evidence of a straight line at the given pixel, the CC stamp module 110 calculates the parameters (r, θ) of the given line. The CC stamp module 110 then ascertains the bin of the accumulator within which those parameters fall, and increments the value of the ascertained bin.

Once the lines are computed, the CC stamp module 110 calculates the corners that intersect between the computed lines. For example, the CC stamp module 110 computes the intersections between computed lines according to the following:

$$(Px, Py) = [((x1y2 - y1x2)(x3 - x4) - (x1 - x2)(x3y4 - y3x4))/$$
$$((x1 - x2)(y3 - y4) - (y1 - y2)(x3 - x4)),$$
$$((x1y2 - y1x2)(y3 - y4) - (y1 - y2)(x3y4 - y3x4))/$$
$$((x1 - x2)(y3 - y4) - (y1 - y2)(x3 - x4)),]$$

In some cases, the geometry observed does not correspond to a quadrilateral. The CC stamp module 110 accounts for this by approximating a polygonal curve for corner points. For a quadrilateral, however, the approximation curve will have four vertices.

In FIG. 5, vertices (x1, y1), (x2, y2), (x3, y3), (x4, y4) are determined from the edge lines 504, 506, 508, 510, and correspond to a geometry of the reproduction location, e.g., where the selected object (e.g., the window 204) is to be reproduced. Vertices (x5, y5), (x6, y6), (x7, y7), (x3, y3) are determined from lines 508, 512, 514, 516, and correspond to a geometry of the source location, e.g., the location from which the object (e.g., the window 204) is selected.

Once the intersections are determined, the CC stamp module 110 generates a geometric matrix representative of the geometry of the image content at the source location $M_s$ and a geometric matrix representative of the geometry of the image content at the reproduction location $M_d$. By way of example, the CC stamp module 110 generates a geometric matrix representative of the geometry of the side 212 of the house 202 (e.g., image content at the reproduction location) from vertices (x1, y1), (x2, y2), (x3, y3), (x4, y4). Using geometric matrix generation techniques, the geometric matrix representative of the side 212 of the house $M_s$ may be generated as follows:

$$\begin{bmatrix} x_1 & x_2 & x_3 & x_4 \\ y_1 & y_2 & y_3 & y_4 \end{bmatrix}$$

Likewise, the CC stamp module 110 generates a geometric matrix representative of the geometry of the front 210 of the house 202 (e.g., image content at the source location) from vertices (x5, y5), (x6, y6), (x7, y7), (x3, y3). The geometric matrix representative of the front 210 of the house $M_d$ may be generated according to geometric matrix generation techniques as follows:

$$\begin{bmatrix} x_5 & x_6 & x_7 & x_3 \\ y_5 & y_6 & y_7 & y_3 \end{bmatrix}$$

Given the source location geometric matrix $M_s$ and the reproduction location geometric matrix $M_d$, the CC stamp module 110 computes a projection matrix $M_p$ using matrix projection techniques and which transforms $M_s \rightarrow M_d$, according to the following:

$$M_s \times M_p = M_d$$

For each pixel of image content at the source location that is reproduced at the reproduction location, the CC stamp module 110 applies the projection matrix. In other words, the adjustments to the selected object (e.g., the window 204) are computed according to the projection matrix. The result of adjusting the selected object (e.g., its pixels) according to the projection matrix is that when the object is reproduced at the reproduction location, the reproduction conforms to the geometry (e.g., the geometric plane) of the reproduction location, as depicted in FIG. 4.

Reproducing source image content so that it conforms to the geometry of image content at a reproduction location can be used in a variety of scenarios other than to copy an object from one side of a building to another. By way of example, a user may wish to reproduce the image content depicted on a first billboard, having a first geometric orientation, on a second billboard that has a second orientation. The image content that is to be reproduced from the first billboard to the second billboard may include text. Using the techniques described herein, the first billboard's image content (e.g., including the text) may be reproduced on the second billboard to conform to the geometric orientation of the second billboard. As a result, the image content (and the text reproduced on the second billboard) may be stretched, or condensed in a different way than it appears on the first billboard to match the geometric orientation of the second billboard's surface. The techniques to conform an object selected for reproduction to the geometry of image content at a reproduction location in a digital image may be used in a variety of other scenarios without departing from the spirit or scope of the techniques described herein.

Having discussed example details of the content-conforming stamp tool techniques, consider now some example procedures to illustrate additional aspects of the techniques.

Example Procedures

This section describes example procedures for content-conforming stamp tool techniques in one or more embodiments. Aspects of the procedures may be implemented in hardware, firmware, or software, or a combination thereof.

The procedures are shown as a set of blocks that specify operations performed by one or more devices and are not necessarily limited to the orders shown for performing the operations by the respective blocks. In at least some embodiments the procedures may be performed by a suitably configured device, such as example computing device 102 of FIG. 1 that makes use of a CC stamp module 110.

Figure 6:
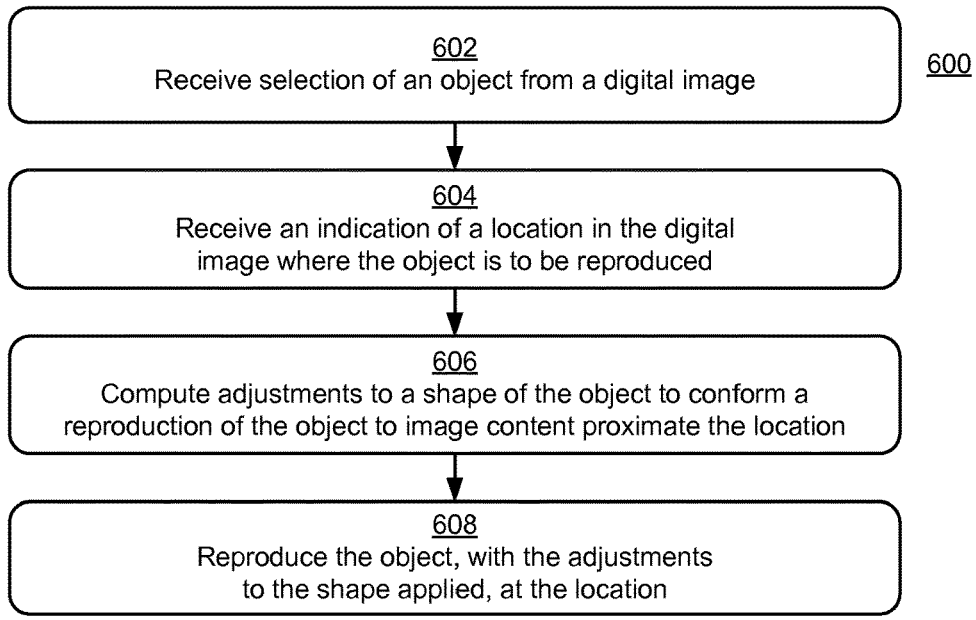
FIG. 6 is a flow diagram depicting an example procedure in accordance with one or more embodiments.

FIG. 6 depicts an example procedure 600 in which an object selected from a digital image is reproduced at a reproduction location to conform to a geometry of image content at the reproduction location. First, selection of an object displayed in a digital image is received (block 602). By way of example, a user selects the window 204 for reproduction from a digital image that includes the house 202. As discussed in more detail above, the user may select the object that is to be reproduced in a variety of ways, e.g., a touch input tapping a portion of touch screen that corresponds to the object. This selection input may be received via a user interface of an image editing application (e.g., Photoshop®) that enables digital images to be edited.

In addition, an indication is received of a selected location in the digital image where the object is to be reproduced (block 604). Continuing with the example in which the window 204 is selected for reproduction from the digital image with the house 202, an indication is received that the window 204 is to be reproduced at a location on the side 212 of the house 202. The user may select to reproduce the window 204 at the location on the side 212 of the house 202 in a variety of different manners, e.g., a touch input tapping a portion of the touch screen that corresponds to the reproduction location.

Once the object to be reproduced and the location where it is to be reproduced are selected, adjustments are computed to a shape of the object to conform a reproduction of the object to image content proximate the selected location (block 606). For example, the CC stamp module 110 computes adjustments to the window 204 so that a reproduction thereof (e.g., the adjusted reproduction 402) conforms to the side 212 of the house 202. Conforming the window 204 to the side 212 of the house 202 refers to changing the window 204 so that it matches the geometric plane of the side 212 of the house 202.

To do so, the CC stamp module 110 uses an edge map of the digital image (e.g., the edge map 502). In the continuing example, the CC stamp module 110 uses the edge map 502 to ascertain an orientation of the front 210 of the house 202, e.g., the source surface corresponding to the portion of the digital image from which the window 204 was selected. The CC stamp module 110 also uses the edge map 502 to ascertain an orientation of the side 212 of the house 202, e.g., the reproduction surface corresponding to the location in the digital image where the window 204 is to be reproduced. Given the orientation of the source surface (e.g., the front 210 of the house 202) and the reproduction surface (e.g., the side 212 of the house 202), the CC stamp module 110 computes a projection matrix that transforms a source matrix indicative of the front 210 to a reproduction matrix indicative of the side 212.

Once the adjustments are computed, the object is reproduced with the adjustments applied at the selected location (block 608). By way of example, the adjustments computed at block 606 are applied to the window 204 to result in the adjusted reproduction 402, which is produced on the side 212 of the house 202. The adjustments computed at block 606 cause the window 204 to be adjusted so that the adjusted reproduction 402 corresponds to a same geometric plane as the side 212 of the house 202. In this way, the adjusted reproduction 402 conforms to the image content proximate the reproduction location.

Figure 7:
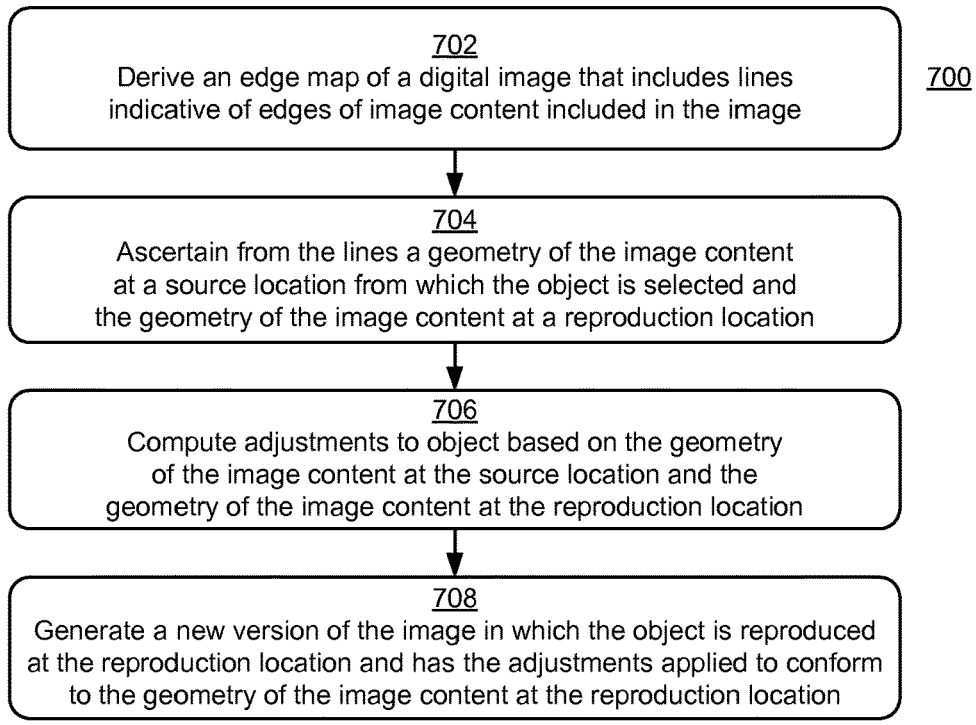
FIG. 7 is a flow diagram depicting another example procedure in accordance with one or more embodiments.

FIG. 7 depicts an example procedure 700 in which an object is selected for reproduction in a digital image and a new version of the digital image is generated in which the object is reproduced to conform to a geometry of image content at a reproduction location. Further, the new version of the digital image may be generated according to the following method steps based on selection of the object and the reproduction location and without additional user interaction. To do so, an edge map of the digital image is derived (block 702). The derived edge map includes lines that indicate edges of the image content included in the digital image. For example, the CC stamp module 110 derives the edge map 502 of the digital image that includes the house 202. The edge map 502 includes lines 504, 506, 508, 510, 512, 514, 516 that are indicative of content of the digital image, e.g., indicative of the house 202.

From the lines of the edge map, a geometry of image content at a source location and a geometry of image content at the reproduction location are ascertained (block 704). The source location corresponds to a location of the digital image from which the object is to be reproduced is selected. The reproduction location corresponds to a location of the digital image where the object is to be reproduced. In an example in which the window 204 is selected for reproduction at the side 212 of the house 202, the front 210 corresponds to the image content at the source location and the side 212 corresponds to the image content at the reproduction location. Thus, the CC stamp module 110 ascertains a geometry of the front 210 of the house 202 and a geometry of the side 212 of the house 202 using the lines of the edge map 502. Since lines 508, 512, 514, 516 correspond to the front 210 of the house 202, the CC stamp module 110 uses those lines to determine the geometry of the front 210. Similarly, since lines 504, 506, 508, 510 correspond to the side 212 of the house 202, the CC stamp module 110 uses those lines to determine the geometry of the side 212. To determine the geometry of the front 210 and the geometry of the side 212 of the house 202, the CC stamp module 110 computes intersections (x1, y1), (x2, y2), (x3, y3), (x4, y4), (x5, y5), (x6, y6), (x7, y7) from the lines 504, 506, 508, 510, 512, 514, 516.

Based on the geometry of the image content at the source location and the geometry of the image content at the reproduction location, adjustments are computed for the object to be reproduced (block 706). For example, the CC stamp module 110 computes adjustments to the window 204 based on the geometries ascertained at block 704 of the front 210 of the house 202 and the side 212 of the house 202. The adjustments to the window 204 may involve transforming each of its pixels according to a projection matrix, which transforms a matrix representative of the geometry of the front 210 to a matrix representative of the geometry of the side 212.

A new version of the digital image is generated in which the object is reproduced at the reproduction location and has the adjustments applied to conform to the geometry of the image content at the reproduction location (block 708). For example, the CC stamp module 110 generates a new version of the digital image of the house 202, e.g. a digital image corresponding to the example in FIG. 4 at 400. In this example, the adjusted reproduction 402 is reproduced at the side 212 of the house 202. The adjustments applied to the window 204 to result in the adjusted reproduction 402 correspond to those computed at block 706. The result is that the adjusted reproduction 402 conforms to the geometry of the side 212 of the house 202. The new version of the digital image may be displayed not only in a user interface of an image editing application but also in other applications. For example, the new version of the digital image may be displayed in a photo viewer application, a word processing application when the new version of the digital image is pasted into a word processing document, and so forth.

Having described example procedures in accordance with one or more embodiments, consider now an example system and device that can be utilized to implement the various techniques described herein.

Example System and Device

Figure 8:
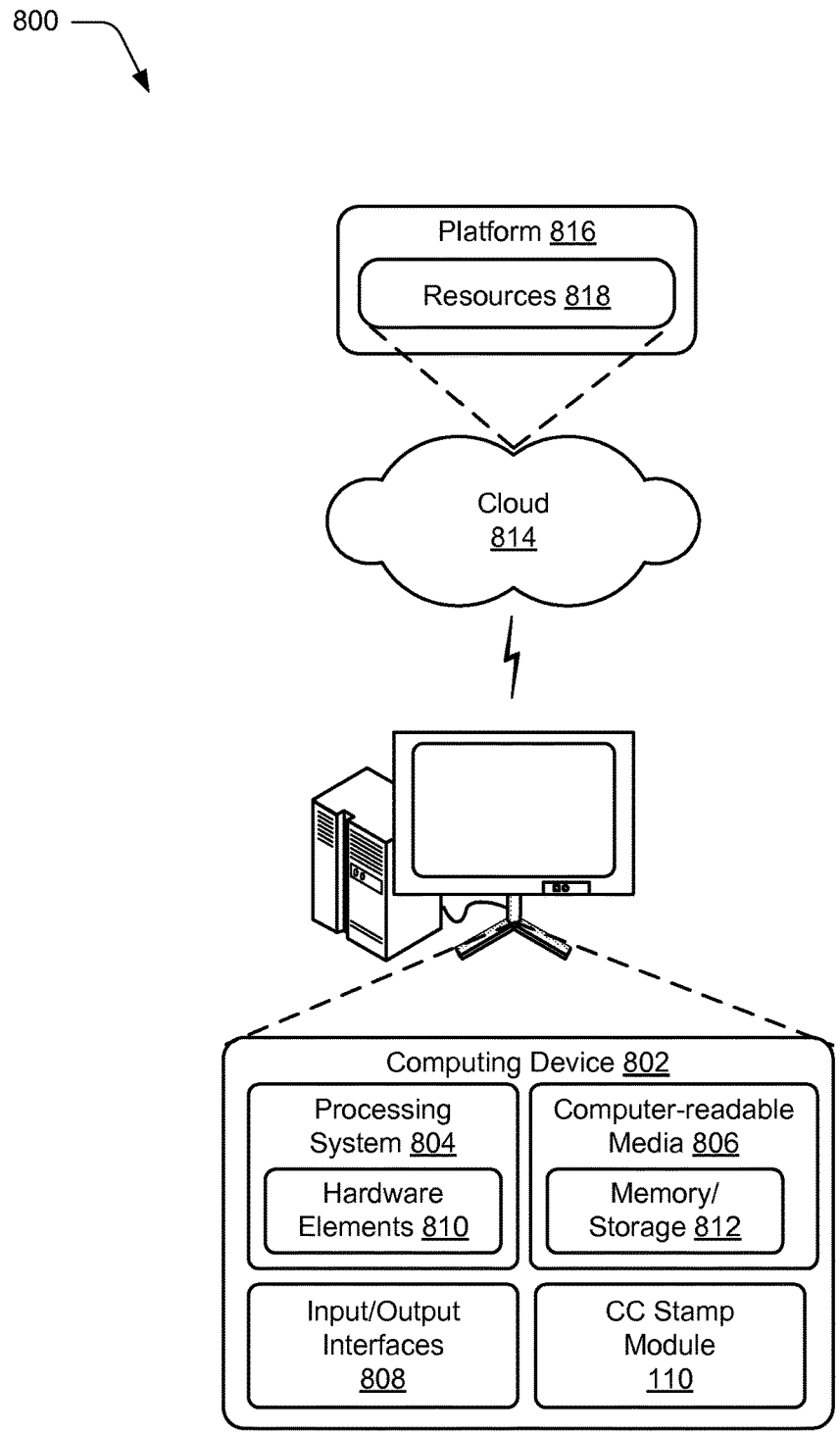
FIG. 8 illustrates an example system including various components of an example device that can be employed for one or more embodiments of the content-conforming stamp tool described herein.

FIG. 8 illustrates an example system generally at 800 that includes an example computing device 802 that is representative of one or more computing systems and/or devices that may implement the various techniques described herein. This is illustrated through inclusion of the CC stamp module 110, which operates as described above. The computing device 802 may be, for example, a server of a service provider, a device associated with a client (e.g., a client device), an on-chip system, and/or any other suitable computing device or computing system.

The example computing device 802 includes a processing system 804, one or more computer-readable media 806, and one or more I/O interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An embodiment of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention, and other equivalent features and acts are intended to be within the scope of the appended claims. Further, various different embodiments are described and it is to be appreciated that each described embodiment can be implemented independently or in connection with one or more other described embodiments.

What is claimed is:

1. A method implemented by a computing device to reproduce and conform an object at a selected location in a digital image, the method comprising:
receiving selection of the object displayed in the digital image;
receiving an indication of the selected location in the digital image where the object is to be reproduced;
computing an edge map of the digital image that includes lines indicative of edges of content in the digital image;
determining a first geometric plane of image content proximate a portion of the digital image from which the object was selected by detecting the lines from the edge map of a first surface that corresponds to the portion of the digital image from which the object was selected and determining a first set of intersections of the lines of the first surface;
determining a second geometric plane of the image content proximate the selected location in the digital image by detecting the lines from the edge map of a second surface that corresponds to the image content proximate the selected location and determining a second set of intersections of the lines of the second surface;
computing adjustments to a shape of the object to conform a reproduction of the object to match the second geometric plane of the image content according to a transformation based on the first and second geometric planes; and
reproducing the object, with the adjustments to the shape applied, at the selected location.

2. A method as described in claim 1, wherein the selection of the object and the location indication are specified according to user input received via operation of a stamp tool of an image editing application.

3. A method as described in claim 1, further comprising generating a new version of the digital image to reproduce the object.

4. A method as described in claim 1, further comprising calculating a projection matrix that transforms a source matrix indicative of the first geometric plane of the first surface to a reproduction matrix indicative of the second geometric plane of the second surface.

5. A method as described in claim 4, wherein the transformation is based on the projection matrix.

6. A method as described in claim 4, wherein detecting the lines that correspond to the first and second surfaces includes performing a Probabilistic Hough Transformation on the edge map to detect lines in the edge map that correspond to the first and second surfaces.

7. A method as described in claim 6, wherein the intersections are used to approximate borders of the first and the second surfaces.

8. A method as described in claim 1, wherein the object that is selected for reproduction includes text and the adjustments conform a reproduction of the text to the image content proximate the location where the text is to be reproduced.

9. A system implemented in a digital environment to conform an object selected for reproduction in image content to a geometry of the image content at a reproduction location, the system comprising:
a display device to display the object in the image content in a user interface;
a processing system to implement a content-conforming stamp tool of an image editing application, the content-conforming stamp tool configured to:
receive selection of the object to be reproduced in the image content, the object selected at a source location in the image content;
receive an indication of the reproduction location in the image content;
compute an edge map of the image content that includes lines indicative of edges of content in the image content;
determine a first geometric plane of the image content at the source location by detecting from the edge map the lines of a first surface that corresponds to the source location and determining a set of intersections of the lines of the first surface;
determine a second geometric plane of the image content at the reproduction location by detecting from the edge map the lines of a second surface that corresponds to the reproduction location and determining a set of intersections of the lines of the second surface;
adjust a shape of the object to conform to the geometry of the image content at the reproduction location by computing a transformation between the first and second geometric planes; and
include an adjusted version of the object in the image content for display at the reproduction location, the adjusted version of the object having the adjusted shape.

10. A system as described in claim 9, wherein the image content from which the object is selected and the image content where the object is reproduced corresponds to a same digital image.

11. A system as described in claim 10, wherein the object that is selected for reproduction includes text and adjustments conform a reproduction of the text to the image content proximate the location where the text is to be reproduced.

12. A system as described in claim 9, wherein the image content from which the object is selected and the image content where the object is reproduced corresponds to a different digital image.

13. A system as described in claim 12, wherein:
the first geometric plane is determined using a first edge map; and
the second geometric plane is determined using a second edge map.

14. A system as described in claim 9, wherein computation of the transformation includes the content-conforming stamp tool configured to:
compute a source matrix that represents the first geometric plane;
compute a reproduction matrix that represents the second geometric plane; and
compute a projection matrix that transforms the source matrix to the reproduction matrix, the projection matrix used by the content-conforming stamp tool to adjust the shape of the object to conform to the geometry of the image content at the reproduction location.

15. A method implemented in a digital environment to conform an object selected for reproduction in a digital image to a geometry of image content at a reproduction location of the digital image, the method comprising:
- deriving an edge map of the digital image by analyzing pixels of the digital image, the edge map including lines that indicate the pixels that correspond to edges of the image content depicted in the digital image;
- determining a first geometric plane of the image content at a source location from which the object is selected and a second geometric plane of the image content at the reproduction location by detecting the lines from the edge map of the image content at the source location and the lines from the edge map of the image content at the reproduction location and determining a set of intersections of the lines of the image content at the source location and another set of intersections of the lines of the image content at the reproduction location;
- calculating a projection matrix that describes a transformation of a matrix indicative of the first geometric plane to a matrix indicative of the second geometric plane;
- computing adjustments to the object according to the transformation based on the projection matrix; and
- generating a new version of the digital image in which the object is reproduced at the reproduction location with the adjustments applied to conform to the second geometric plane of the image content at the reproduction location.

16. A method as described in claim 15, wherein the edge map is derived by:
- finding edges in the digital image using a modified canny edge detector; and
- performing adaptive hysteresis and localization to ignore noise in the digital image which results in the detection of false edges.

17. A method as described in claim 16, further comprising receiving user input to select the object for reproduction.

18. A method as described in claim 16, further comprising receiving user input to select the reproduction location.

19. A method as described in claim 16, further comprising performing the deriving, determining, computing, and generating automatically in response to receiving the user input to select the reproduction location and without additional user interaction.

20. A method as described in claim 15, wherein the object that is selected for reproduction includes text and the adjustments conform a reproduction of the text to the image content proximate the location where the text is to be reproduced.

* * * * *